(12) United States Patent
Li et al.

(10) Patent No.: US 7,747,581 B1
(45) Date of Patent: Jun. 29, 2010

(54) NETWORK FILE SYSTEM-BASED DATA STORAGE SYSTEM

(75) Inventors: Kai Li, Princeton, NJ (US); R. Hugo Patterson, Mountain View, CA (US); Ming Benjamin Zhu, Palo Alto, CA (US); Allan Bricker, Sunnyvale, CA (US); Richard Johnsson, Palo Alto, CA (US); Sazzala Reddy, Mountain View, CA (US); Jeffery Zabarsky, Sunnyvale, CA (US)

(73) Assignee: EMC Corporation, Hopkinton, MA (US)

( * ) Notice: Subject to any disclaimer, the term of this patent is extended or adjusted under 35 U.S.C. 154(b) by 420 days.

(21) Appl. No.: 11/788,407

(22) Filed: Apr. 19, 2007

Related U.S. Application Data

(62) Division of application No. 10/942,174, filed on Sep. 15, 2004.

(51) Int. Cl.
*G06F 17/30* (2006.01)

(52) U.S. Cl. .................................................. 707/686

(58) Field of Classification Search ....................... None
See application file for complete search history.

(56) References Cited

U.S. PATENT DOCUMENTS

| | | | |
|---|---|---|---|
| 4,814,746 A | 3/1989 | Miller et al. | |
| 5,204,958 A * | 4/1993 | Cheng et al. | 707/102 |
| 5,640,554 A * | 6/1997 | Take | 707/7 |
| 5,754,888 A | 5/1998 | Yang et al. | |
| 5,990,810 A | 11/1999 | Williams | |
| 6,032,216 A * | 2/2000 | Schmuck et al. | 710/200 |
| 6,057,790 A | 5/2000 | Igata et al. | |
| 6,148,382 A * | 11/2000 | Bitner et al. | 711/162 |
| 6,343,341 B1 * | 1/2002 | Cabrera et al. | 711/111 |
| 6,928,526 B1 | 8/2005 | Zhu et al. | |
| 6,952,730 B1 * | 10/2005 | Najork et al. | 709/225 |
| 6,961,893 B1 | 11/2005 | Mukund et al. | |
| 7,093,099 B2 * | 8/2006 | Bodas et al. | 711/206 |
| 7,136,903 B1 | 11/2006 | Phillips et al. | |
| 7,143,251 B1 | 11/2006 | Patterson | |
| 7,260,703 B1 | 8/2007 | Moore et al. | |
| 7,373,464 B2 | 5/2008 | Zhu et al. | |
| 7,424,498 B1 | 9/2008 | Patterson | |

(Continued)

OTHER PUBLICATIONS

"Data Domain Delivers Breakthrough Protection and Simplicity in a Cost-Effective, Disk-Based Recovery Appliance", Jun. 9, 2003, 2 pgs., downloaded from http://www.datadomain.com/news/press_rel_060903.html on Jan. 26, 2009.

(Continued)

*Primary Examiner*—John R. Cottingham
*Assistant Examiner*—Robert Timblin
(74) *Attorney, Agent, or Firm*—Blakely, Sokoloff, Taylor & Zafman, LLP

(57) ABSTRACT

A network file system-based data storage system that converts random I/O requests into a piecewise sequential data structure to facilitate variable length data segment redundancy identification and elimination. For one embodiment of the invention a stateless network file system is employed. For one such embodiment, that provides multiple-client access to stored data, multiple Writes are buffered and then broken into variable length data segments. Redundant segment elimination is then effected. One embodiment of the invention allows sharing of the variable length data segments among files.

25 Claims, 8 Drawing Sheets

U.S. PATENT DOCUMENTS

| | | | |
|---|---|---|---|
| 7,451,168 | B1 | 11/2008 | Patterson |
| 2001/0037323 | A1 | 11/2001 | Moulton et al. |
| 2002/0161860 | A1* | 10/2002 | Godlin et al. ............... 709/219 |
| 2004/0098415 | A1 | 5/2004 | Bone et al. |
| 2007/0101074 | A1 | 5/2007 | Patterson |
| 2008/0183767 | A1 | 7/2008 | Zhu et al. |

OTHER PUBLICATIONS

"Data Domain Ships First Recovery Appliance That Combines Massive Data Compression with High Throughput," Feb. 3, 2004, 2 pgs., downloaded from http://www.datadomain.com/news/press_rel_020304.html on Jan. 26, 2009.

Jacob Ziv et al., "A Universal Algorithm for Sequential Data Compression," May 1977, pp. 337-343, IEEE Transactions on Information Theory, vol. IT-23, No. 3.

R. Hugo Patterson et al., "Method and Apparatus for Storing Composite Data Streams," U.S. Appl. No. 10/779,355, filed Feb. 13, 2004.

Andrei Z. Broder: "Some applications of Rabin's fingerprinting method", published in R. Capocelli, A. De Santis, U. Vaccaro (eds), Sequences II: Methods in Communications, Security, and Computer Science, Springler-Verlag, 1993.

Matei Ripeanu et al.: "Bloom Filter at http://www.nist.gov/dads/HTML/bloomfilt.html", Nist Centennial, 2002.

Sean Quinlan et al.: "Venti: a new approach to archival storage", Proceedings of the FAST 2002 Conference on File and Storage Technologies, Monterey California, 2002.

Athicha Muthitacharoen et al.: "A Low-bandwidth Network File System", MIT Laboratory for Computer Science and NYU Department of Computer Science.

Udi Manber: "Finding Similar Files in A Large File System", Department of Computer Science at University of Arizona, 1993.

Sharp, J., and Jagger, J. Microsoft® Visual C#®.NET Step by Step: Version 2003 [online]. Microsoft Press, 2003 [retrieved on Dec. 5, 2006]. Retrieved from the Internet:< URL: http://proquest.safaribooksonline.com/0735619093 > Chapter 13, Section: "How Does the Garbage Collector Run?.".

M. Burrows et al., "A Block-sorting Lossless Data Compression Algorithm," SRC Research Report, May 10, 1994, 24 pgs., Digital Equipment Corporation, Palo Alto, California.

L. Peter Deutsch, "GZIP file format specification version 4.3," Network Working Group, RFC 1952, May 1996, pp. 1-12.

John G. Cleary et al., "Unbounded Length Contexts for PPM," Proceedings DCC-95, 1995, pp. 1-10, IEEE Computer Society Press.

Non-Final Office Action dated Dec. 27, 2006, U.S. Appl. No. 10/942,174.

Final Office Action dated Jul. 11, 2007, U.S. Appl. No. 10/942,174.

Non-Final Office Action dated Feb. 4, 2008, U.S. Appl. No. 10/942,174.

Final Office Action dated Jun. 17, 2008, U.S. Appl. No. 10/942,174.

Non-Final Office Action dated Sep. 25, 2008, U.S. Appl. No. 10/942,174.

Final Office Action dated Aug. 13, 2009, U.S. Appl. No. 10/942,174.

Notice of Allowance dated Dec. 28, 2009, U.S. Appl. No. 10/942,174.

* cited by examiner

NETWORK FILE SYSTEM-BASED DATA STORAGE SYSTEM

CROSS-REFERENCE TO RELATED APPLICATIONS

This application is a divisional of U.S. patent application Ser. No. 10/942,174 filed on Sep. 15, 2004.

RELATED APPLICATIONS

This application is related to U.S. patent application Ser. No. 10/325,690, entitled "EFFICIENT DATA STORAGE SYSTEM", filed on Dec. 20, 2002, U.S. patent application Ser. No. 10/611,309, now U.S. Pat. No. 7,143,251, entitled "DATA STORAGE USING IDENTIFIERS", filed on Jun. 30, 2003; U.S. patent application Ser. No. 10/611,237, entitled "PROBABILISTIC SUMMARY DATA STRUCTURE BASED ENCODING FOR GARBAGE COLLECTION", filed on Jun. 30, 2003, U.S. patent application Ser. No. 10/611,291, entitled "INCREMENTAL GARBAGE COLLECTION OF DATA IN A SECONDARY STORAGE", filed on Jun. 30, 2003, and U.S. patent application Ser. No. 10/779,355, entitled "METHOD AND APPARATUS FOR STORING COMPOSITE DATA STREAMS", filed Feb. 13, 2004, all of which are assigned to the assignee of this application and are incorporated herein by reference.

FIELD

Embodiments of the invention relate generally to the field of data storage and more specifically to a network file system-based data storage system.

BACKGROUND

The increasing use and complexity of computer applications has led to a corresponding increase in data storage requirements. The costs associated with data storage are directly related to the efficiency and reliability of the data storage scheme employed. As such there is a continuing effort to improve data storage systems.

A file system is a scheme for storing and organizing electronic data with the goal of making such data easy to locate and access. In general, a file system consists of abstract data types implemented to effect the storage, organization, retrieval, and modification of the stored data. Typically, file systems used for large-scale data storage include one or more dedicated computers and software systems to manage data.

Conventional file systems include an underlying data storage device that offers access to an array of fixed-size blocks (e.g., 512-byte sectors). File system software organizes the blocks into files and directories and maintains associations between blocks and corresponding files.

File systems may be implemented as disk file systems in which data is stored to and accessed from a disk drive, which may be directly or indirectly connected to a computing system. File systems may also be implemented as network file systems in which data is stored and accessed over a network (e.g., a local area network (LAN)). A network file system is a distributed file system of files and directories located on remote computers within a network. Use of a network file system provides several advantages including, the management of remote files and directories as if they are local, mount referenced files systems, configuration of security options, management of mount properties and establish access permissions for hosts. Using a network file system, data may be stored and accessed by multiple computing systems concurrently. Network file systems may include, for example, NetWare Core Protocol (NCP) of Novell, Inc., Orem, Utah, the Common Internet File System (CIFS) developed by Microsoft Corporation of Redmond, Wash., and the UNIX-based Network File System (NFS) developed by Sun Microsystems, of Santa Clara, Calif.

One application for a file system, including a network file system, is to affect a backup storage scheme. That is, the continued increase in data storage has been accompanied by an increasing need to have an accurate record of the state of particular data stores at specified times. A backup of stored data may be created to affect recovery of data upon a catastrophic failure or to maintain a record of the state of the data at given times.

As noted above, a variety of schemes have been developed to provide more efficient data storage and such schemes are particularly applicable to data backup systems. This is because, depending upon the required backup frequency, enormous amounts of data are typically stored to provide reliable and updated backup data. This data must be stored efficiently to provide a cost-effective data backup scheme.

Network file systems, though providing numerous advantages in regard to storing and accessing data are often incompatible with techniques for improved storage efficiency and reliability. For example, typical network file systems (e.g., NFS) are stateless (i.e., for the NFS protocol, the state of interactions between the server and a client are not tracked or managed by the server during a session). So, if a client makes a request to a server, and after satisfying that request the server fails and is restarted, the server must be able to handle subsequent related requests from the client without needing to access state data that was lost when the server failed.

In general, this statelessness is achieved because each request has sufficient information to completely define the request. The required state is saved at the client and passed to the server with each request. In particular, the NFS protocol defines a data structure called a "file handle." The file handle contains sufficient information to uniquely identify the file to be accessed. The advantage and purpose of a stateless server is to improve robustness by being able to continue file access in spite of the failure and restart of the file server.

However, statelessness means that when a file is transferred using the NFS protocol, it may be transferred as a number of fixed size blocks (e.g., 32 Kb blocks), which need not be in order.

Such fixed-size, unordered, data transmissions may be incompatible with data storage schemes that reduce or eliminate redundancies to improve storage efficiency and/or reliability.

BRIEF DESCRIPTION OF THE DRAWINGS

The invention may be best understood by referring to the following description and accompanying drawings that are used to illustrate embodiments of the invention. In the drawings.

The SFS uses the file metadata for file Write accesses.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Overview

Embodiments of the invention provide a network file system-based data storage system that converts random I/O requests (file accesses) into a piecewise sequential data structure (stream) (PSDS) to facilitate variable length data segment (VLDS) redundancy identification and elimination. For one embodiment of the invention a stateless network file system is employed. For one such embodiment, that provides multiple-client access to stored data, multiple Writes are buffered and then broken into VLDSs. Redundant segment elimination is then effected. One embodiment of the invention allows VLDS sharing among files. For one embodiment of the invention an index is employed to maintain storage status for each VLDS. For one such embodiment the storage status index is implemented on-disk.

Figure 1:
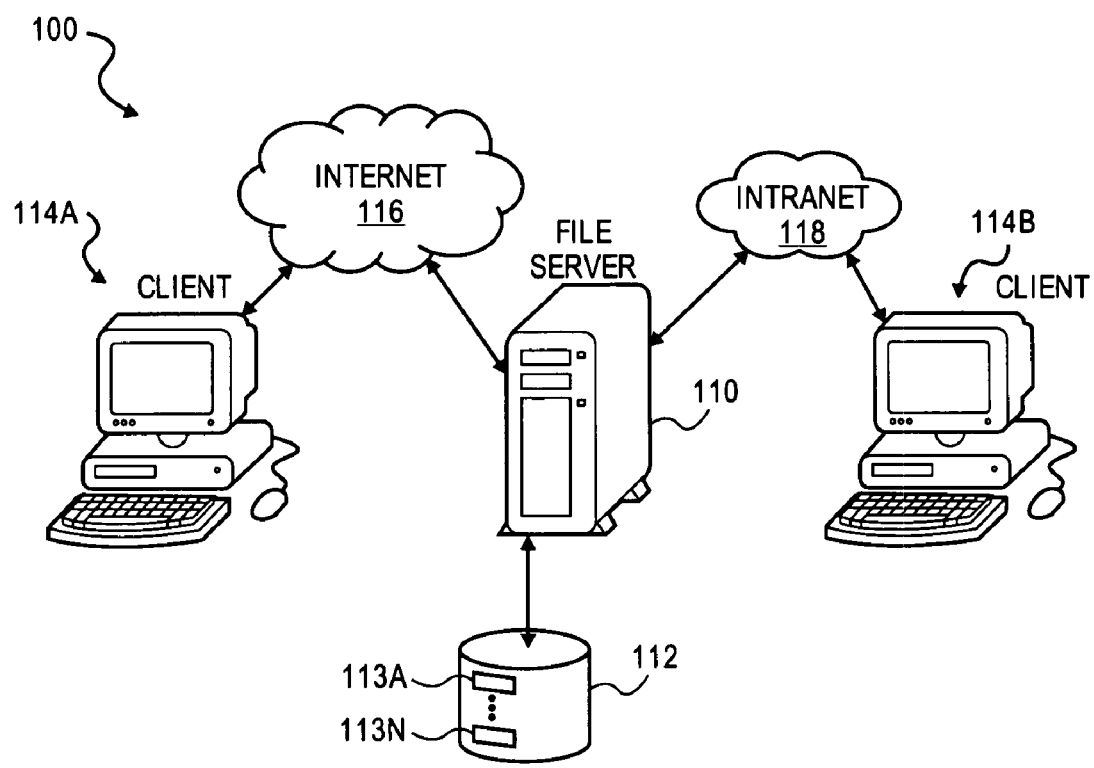
FIG. 1 illustrates a network file system-based data storage system in accordance with one embodiment of the invention.

FIG. 1 illustrates a network file system-based data storage system in accordance with one embodiment of the invention. System 100, shown in FIG. 1, includes a file server system 110. For one embodiment the file server system receives random I/O requests that may include random Read or Write block operations, or Delete operations, which may apply to an entire file or truncate the length of a file. Such operations may pertain to fixed-sized blocks. The file server system 110 has an associated data storage device 112 that stores a plurality of data 113a-113n. Data 113a-113n may be of various types including data files, executable files, scripts, etc. The data 113a-113n is available for access by client systems, such as clients 114a and 114b. Client 114a, which may be implemented as a conventional desktop computer system (as shown) or alternatively as any other type of computing system or digital processing system, is coupled to file server system 110 via the Internet 116, which, as well known in the art, is a worldwide collection of networks and gateways that employ the Transmission Control Protocol/Internet Protocol (TCP/IP) suite of protocols to communicate data between clients and servers having a variety of underlying hardware platforms.

Client 114b, which may also be implemented as a desktop computer system or any other type of digital processing system, is coupled to file server system 110 by a Local Area Network (LAN), for example, intranet 118. Intranet 118 may support communication protocols other than the TCP/IP suite of protocols employed by Internet 116.

In accordance with one embodiment of the invention, file server system 110 implements an architecture that provides efficient storage of data 113a-113n by compressing the stored data at a fine-grained VLDS level through VLDS sharing among files and identification and elimination of redundant VLDSs.

System Architecture

Figure 2:
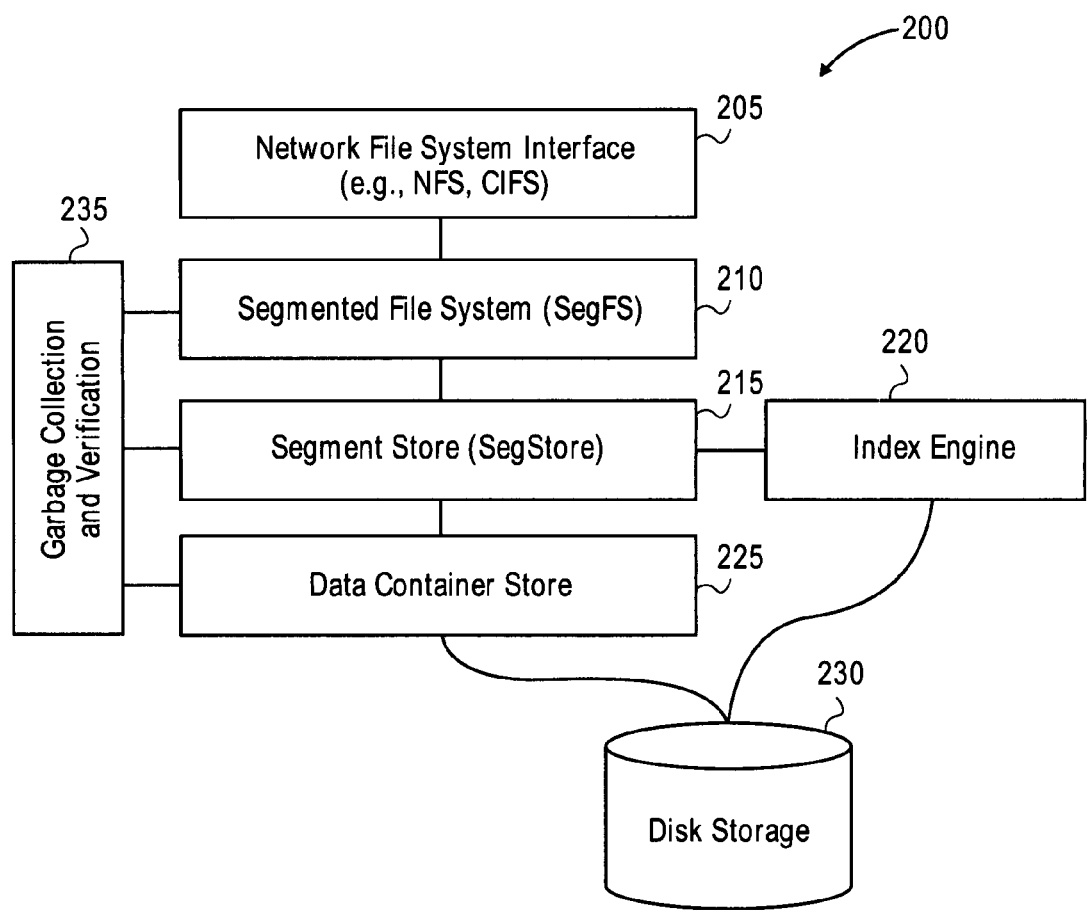
FIG. 2 illustrates an exemplary system architecture for a network file system-based data storage system in accordance with one embodiment of the invention.

FIG. 2 illustrates an exemplary system architecture for a network file system-based data storage system in accordance with one embodiment of the invention. System architecture 200, shown in FIG. 2, includes a network file system interface (NFSIF) 205. The NFSIF 205 implements any of a variety standard file system protocols in accordance with alternative embodiments of the invention. For example, the NFSIF may implement NFS, CIFS, NCP, Global File System (GFS), Appleshare, InterMezzo File System (IMFS), and Andrew File System (AFS), among others. The NFSIF 205 sorts simultaneous file accesses into individual file accesses that can be used by the segment file system (SFS) 210 to read and write VLDSs.

The SFS 210 implements a local file system in which each file is comprised of one or more VLDSs. The SFS 210 uses fingerprints (e.g., checksums) as pointers to VLDSs that can be shared within and among files. For write operations, the SFS 210 receives random fixed size blocks from the NFSIF 205, buffers the data blocks, converts the buffered data into PSDSs, calls the segment store 215 to segment each PSDS into one or more VLDSs, receives a descriptor for each VLDS, and stores the descriptors in the SFS file system metadata as the pointers to the VLDSs. For read operations, the SFS 210 receives random block data requests from the NFSIF 205, converts them to VLDS requests, calls the segment store 215 to retrieve the VLDSs, converts the VLDSs to data blocks, and passes the data blocks to the NFSIF 205.

The segment store 215 and index engine 220 work together to create VLDSs, compute fingerprints for each VLDS, and identify and eliminate (delete) redundant VLDSs. The segment store 215 acts as a database for storing fingerprinted VLDSs. The segment store 215 stores the data segments along with various metadata in containers. The index engine 220 maintains a fingerprint entry for each VLDS and maps each fingerprint to a particular VLDS container (data container (DC)) where the corresponding VLDS is stored.

The data container store (DCS) 225 stores and retrieves DCs and combines multiple VLDSs for efficient entropy coding compression. For one embodiment of the invention, the DCs are relatively large (e.g., one or more Megabytes), allowing large sequential accesses to disk storage 230, thus providing greater efficiency an exemplary embodiment of which is described in U.S. patent Application number "TBD", entitled "EFFICIENT DATA STORAGE SYSTEM", filed on "TBD."

After identification and elimination of redundant VLDSs, the segment store 215 effects a compression of the unique VLDSs using one or more entropy coding schemes alone or in combination. In accordance with various alternative embodiments of the invention, such entropy coding schemes may include, for example, run-length encoding (RLE), Huffman coding, Arithmetic coding, Context coding, LZ77, LZ78, other LZ variations including LZW and Deflate, and Transformation coding, and combinations thereof, among others.

For one embodiment of the invention, system architecture 200 includes a garbage collection and verification component (GCVC) 235 as shown in FIG. 2. The GCVC 235 effects two processes, a garbage collection process to reclaim storage space and a verification process to ensure data integrity and correctness.

The garbage collection process consists of two general operations. The first operation is to determine all reachable VLDSs from all file metadata. The second operation is to copy all reachable VLDSs and reclaim the space used by unreachable data segments. Exemplary garbage collection algorithms that may be implemented alone or in combination in accordance with alternative embodiments of the invention are described in related U.S. patent application Ser. No. 10/611,237, "PROBABILISTIC SUMMARY DATA STRUCTURE BASED ENCODING FOR GARBAGE COLLECTION", filed on Jun. 30, 2003, and U.S. patent application Ser. No. 09/611,291, entitled "INCREMENTAL GARBAGE COLLECTION OF DATA IN A SECONDARY STORAGE", filed on Jun. 30, 2003.

The verification process ensures that all data has been written correctly. The process verify all SFS files by analyzing the file sequentially to check segment descriptors and file index data structures and then verifying that every segment descriptor refers to a data segment actually stored in a container. The process uncompresses data segments in a data container, re-fingerprints the segments, and check the logical structure of the metadata.

Network File System Interface

The NFSIF implements a standard file system interface and sorts simultaneous file accesses into individual file accesses that can be used by the SFS to read and write VLDSs.

Figure 3:
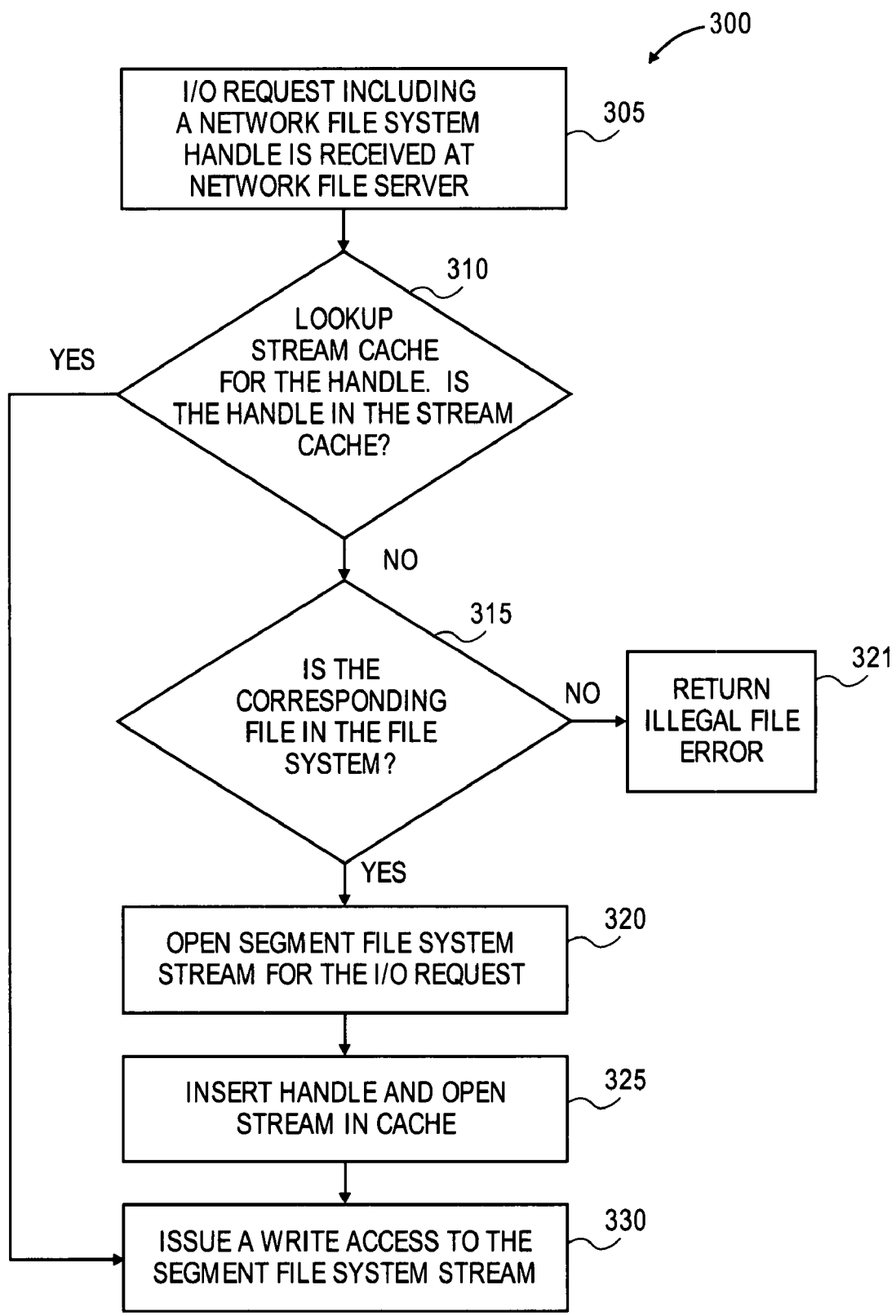
FIG. 3 illustrates a process by which standard network file system handles are converted into internal data stream ids in accordance with one embodiment of the invention.

FIG. 3 illustrates a process by which standard network file system handles are converted into internal data stream ids in accordance with one embodiment of the invention. Process 300, shown in FIG. 3, begins at operation 305 an I/O request, including a typical network file system handle, is received at the network file server. For example, NFS v3 standard includes a global handle that allows for statelessness. The I/O request may be a Read, received in the form of Read (handle, buffer, size) or a Write, received in the form of Write (handle, data).

For one embodiment of the invention, the network file system-based data storage system employs an active stream cache for fast translation of network file system handles into streams. The stream cache contains all active streams. At operation 310 a lookup is effected to determine if the handle is in the stream cache.

If, at operation 310, the handle is in the stream cache, then the I/O operation is continued with a Write access issued to the already opened SFS stream at operation 330. If, at operation 310, the handle is not in the stream cache, then a determination is made as to whether the corresponding file is in the file system at operation 315. This determination may be effected by analyzing data structures that contain file information (e.g., inodes in Unix file systems).

If, at operation 315, the corresponding file is in the file system, then an SFS stream for the file is opened at operation 320. The handle and stream ID are then inserted into the stream cache at operation 325, and a write access is issued to the SFS stream at operation 330. If, at operation 315, the corresponding file is not in the file system, then an illegal file error is returned at operation 321.

Thus, for one embodiment, the handle is converted to a stream ID to facilitate conversion of random file accesses to a particular file into a stream of data accesses. In accordance with alternative embodiments of the invention, the streams will be closed when the files are closed, when the network file system has timed out, or when the system is shut down.

Segment File System/Segment Store

The SFS implements a local file system in which each file is comprised of one or more VLDSs. The SFS uses Segment Ids as pointers to VLDSs that can be shared within and among files. By eliminating redundant data segments, SFS can achieve a high degree of compression that is very reliable.

Figure 4:
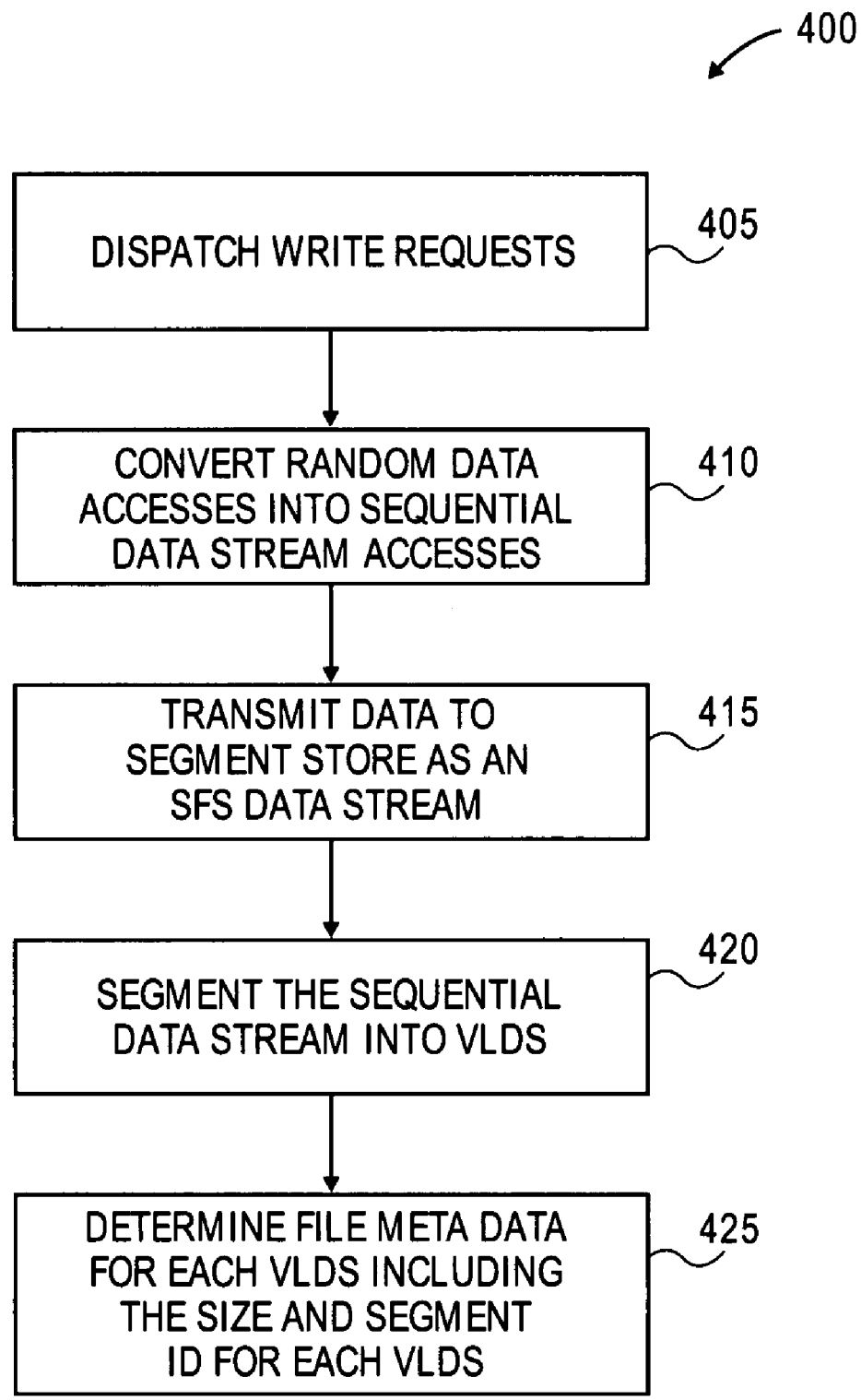
FIG. 4 illustrates a Write dataflow in accordance with one embodiment of the invention.

FIG. 4 illustrates a Write dataflow in accordance with one embodiment of the invention. Process 400, shown in FIG. 4, begins at operation 405 in which a number of Write requests are dispatched.

At operation 410 the data is buffered, if necessary (e.g., the data is not sequential). The SFS converts random data accesses into sequential stream data accesses for each individual file.

At operation 415 the buffered data is transmitted to the segment store as an SFS data stream. The data stream is used to batch up requests to pass to the segment store.

At operation 420 the segment store segments each of the SFS data streams into a number of VLDSs.

At operation 425 the file metadata is determined for each VLDS including the size and Segment ID for each VLDS. In accordance with one embodiment of the invention, the file metadata includes a file descriptor for each VLDS. Each file descriptor consists of a fingerprint and size for each VLDS. For one embodiment of the invention, the segment store will return a sequence of VLDS descriptors including fingerprints and sizes for each VLDS. The SFS then uses this information to build the file metadata for each stream. A network file system-based data storage system in accordance with one embodiment of the invention uses fingerprints to eliminate redundant VLDSs and Segment Ids to relocate VLDSs without changing any file metadata. Exemplary methods for implementing a redundant VLDS identification and elimination scheme that may be used in accordance with various embodiments of the invention are described in related U.S. Patent Application number "TBD", entitled "DATA STORAGE USING IDENTIFIERS", filed on "TBD" and U.S. Patent Application number "TBD", entitled "EFFICIENT DATA STORAGE SYSTEM", filed on "TBD".

In accordance with one embodiment of the invention, after identifying and eliminating redundant VLDSs, the segment store compresses the unique VLDSs using an entropy coding method. The segment store then stores the VLDSs (i.e., unique compressed VLDSs) in DCs in the DCS.

Figure 5:
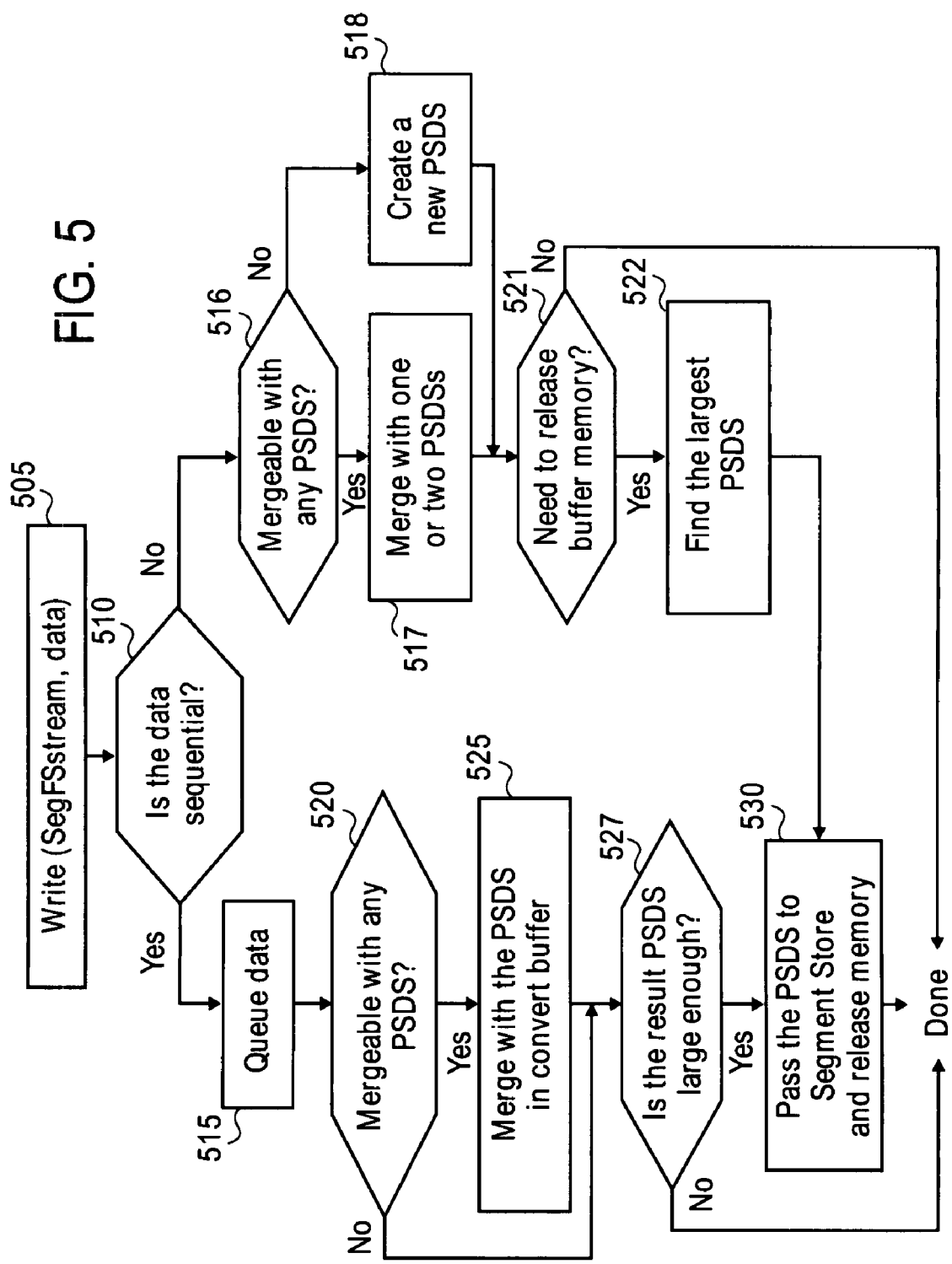
FIG. 5 illustrates a process by a Write access to an SFS stream is processed in accordance with one embodiment of the invention.

The SFS uses the file metadata for file Write accesses. FIG. 5 illustrates a process by a Write access to an SFS stream is processed in accordance with one embodiment of the invention. Process 500, shown in FIG. 5, begins at operation 505 in which an SFS stream of the form Write (SFSstream, data) is created as described above in reference to process 300 of FIG. 3.

At operation 510 a determination is made as to whether the Write access is sequential.

If at operation 510 it is determined that the Write access is sequential, the data is queued at operation 515. A determination is made as to whether the data is mergeable with any PSDS the convert buffer at operation 520.

If at operation 520 it is determined that the queued data is mergeable with a PSDS in the convert buffer, the queued data and the PSDS are merged at operation 525. A determination is made as to whether the merged result PSDS is large enough to pass to the segment store 215 at operation 527. If at operation 527 it is determined that the PSDS is large enough, the PSDS is passed to the segment store 215 at operation 530. If at operation 520 it is determined that the queued data is not mergeable with, any PSDS in the convert buffer, the queued data will be viewed as a PSDS to be checked to determine whether it is large enough to pass to the segment store at 527.

If, at operation 510 it is determined that the Write access is not sequential, the process proceeds at operation 516 to determine whether the data is mergeable with any PSDS in the convert buffer. If, at operation 516 it is determined that the data is mergeable, the data is merged with one or two PSDSs at operation 517. If, at operation 516 it is determined that the data is not mergeable with any PSDS in the convert buffer, the data is placed in the convert buffer as a new PSDS.

At operation 521 a determination is made as to whether the convert buffer and PSDSs consume too much memory. If at operation 521, it is determined that the memory needs to be released, then the largest PSDS is determined at operation 522 and passed to the segment store 215 at operation 530.

Figure 6:
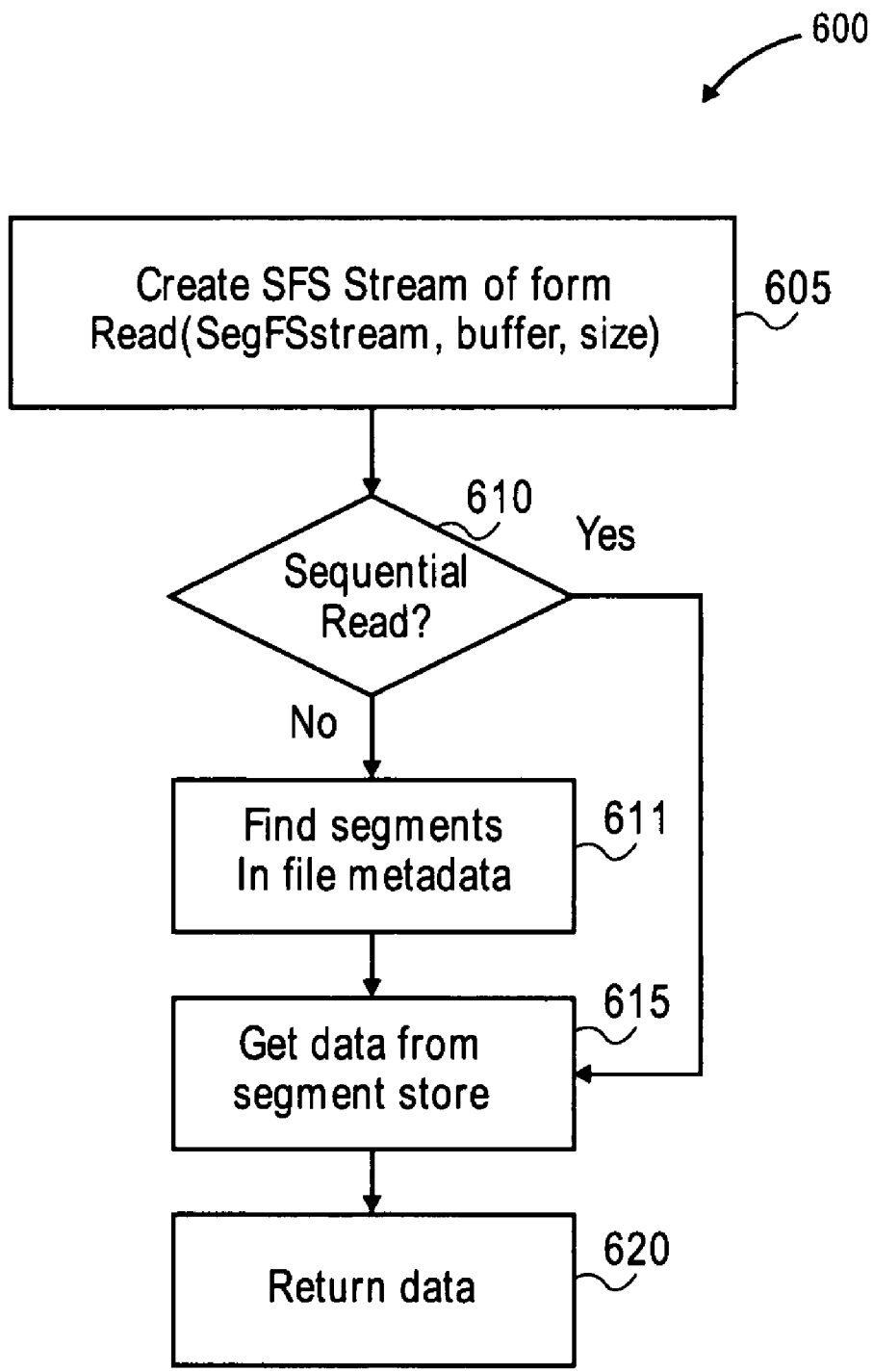
FIG. 6 illustrates a Read access to an SFS stream is processed in accordance with one embodiment of the invention.

The SFS uses the VLDS descriptors to retrieve VLDSs for read accesses. FIG. 6 illustrates a Read access to an SFS stream is processed in accordance with one embodiment of the invention. Process 600, shown in FIG. 6, begins at operation 605 in which a Read (SFS stream, buffer, size) is created as described above in reference to process 300 of FIG. 3.

At operation 610 a determination is made as to whether the Read access is sequential.

If at operation 610 it is determined that the Read access is not sequential, the cursor pointing to VLDS descriptors is repositioned to the descriptors in the file metadata for the requested data at operation 611. That is, the SFS determines the location of the required VLDS descriptors in file metadata and positions the cursor there.

If at operation 610 it is determined that the Read access is sequential, or after operation 611, the SFS retrieves the VLDS descriptors at the metadata cursor, advances the cursor, and calls the segment store to retrieve the VLDSs at operation 615.

The data is then returned at operation 620.

Index Engine

As described above in reference to FIG. 2, the segment store works together with an index engine to create VLDSs, compute fingerprints for each VLDS, and identify and eliminate redundant VLDSs. The index engine maintains an entry for some or all of the VLDS and maps each entry to a particular DC where the corresponding VLDS is stored. The DCS stores and retrieves DCs and combines multiple VLDSs for efficient entropy coding compression. For one embodiment of the invention, the index maps from a Segment ID to a storage location. For one such embodiment, the Segment ID includes a fingerprint or hash of the data segment. In some embodiments, the data segment may be a fixed size block. The data segment may be part of a storage system which does not include a file system.

While the index is described as mapping Segment ID to a storage location, for alternative embodiments of the invention, the index may map any segment-related data, which may include segment-related data other than Segment Ids, to various segment location-related data. For one embodiment of the invention, the segment-related data is segment content-related data (e.g., a fingerprint or hash of the data segment). For one such embodiment, the segment location-related data is a physical storage location of the segment.

For one embodiment of the invention the index maps to a DC ID and a separate table then maps from the DC ID to a specified storage location. For purposes of this discussion, mapping to a storage location is viewed as equivalent to mapping to a DC ID.

The index is accessed for segment filtering during write, as well as for data retrievals. New entries are added when new containers are synchronized to permanent storage.

The index engine provides operations for the creation, update, and lookup of the on-disk representation of the index.

Figure 7:
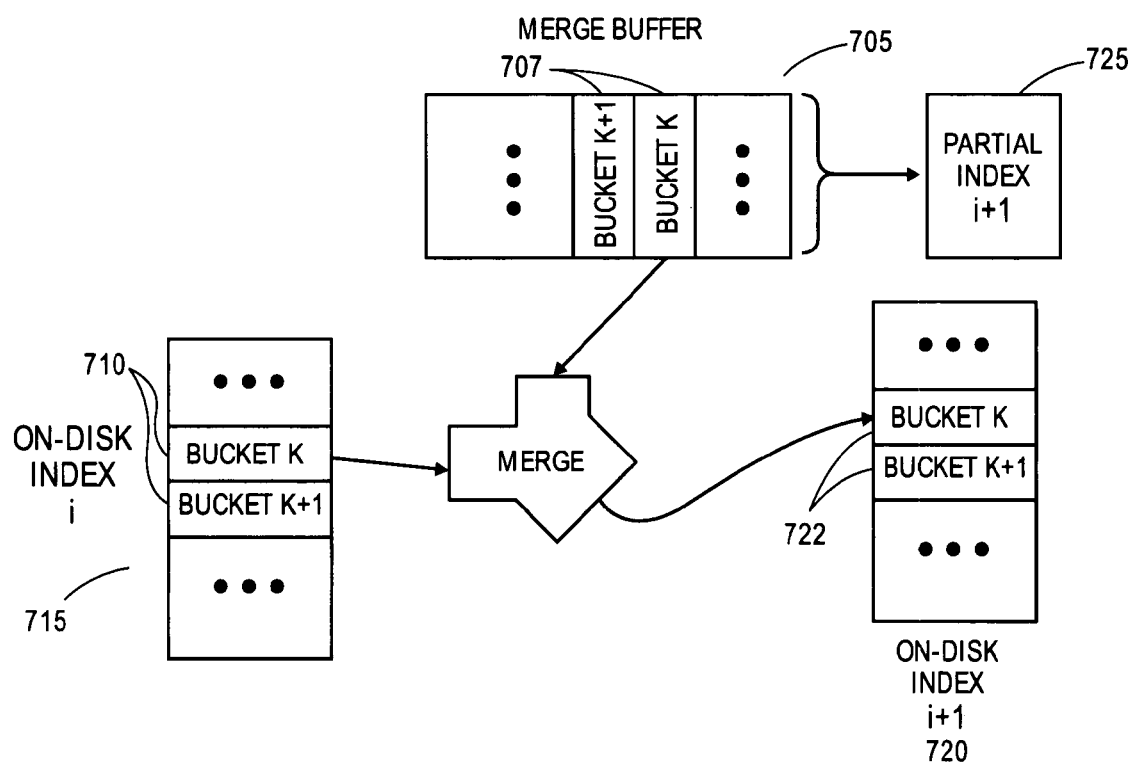
FIGS. 7 and 7A illustrate an implementation of an index engine for a network file system-based data storage system in accordance with one embodiment of the invention.
Figure 7A:
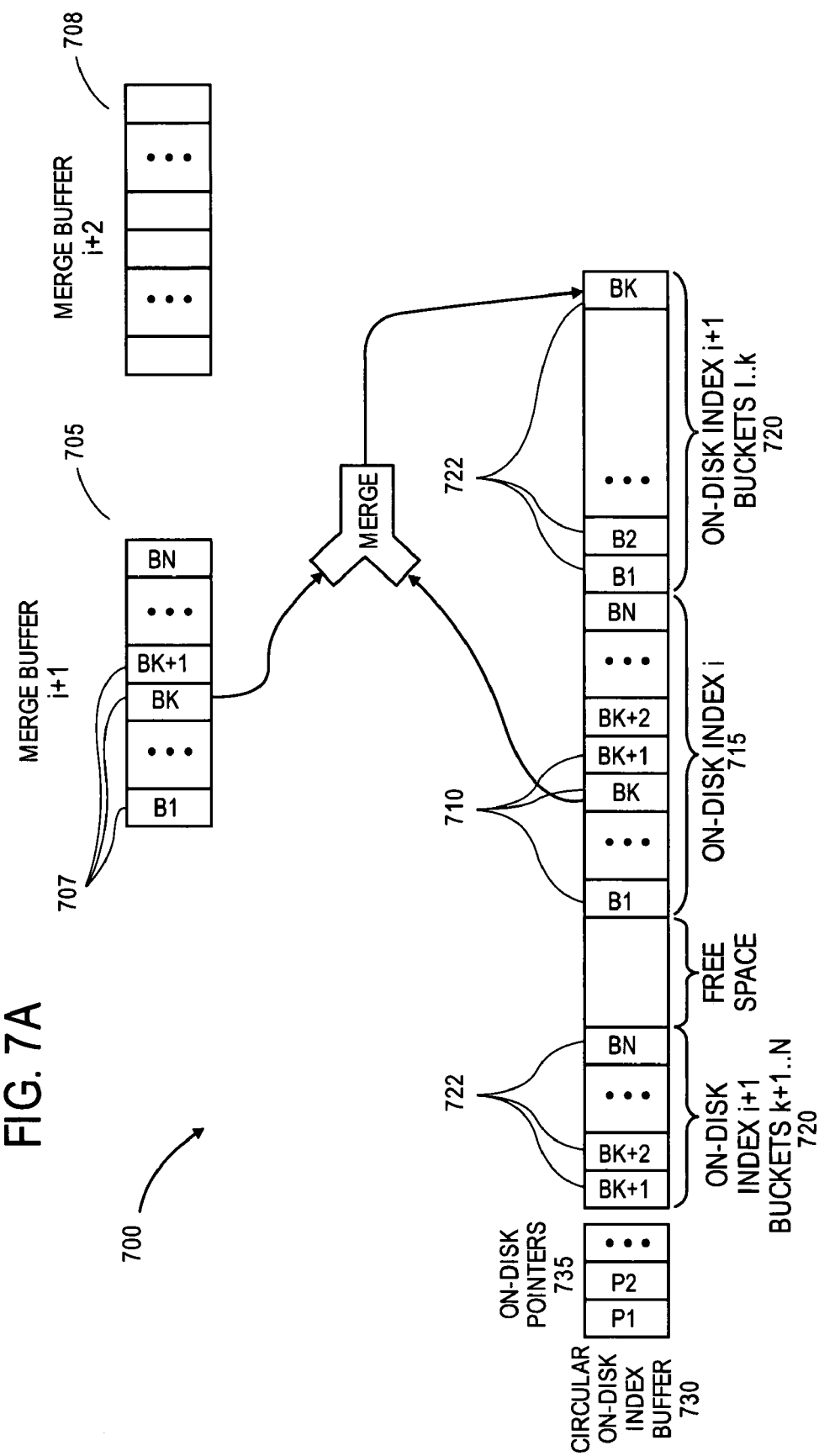

FIGS. 7 and 7A illustrate an implementation of an index engine for a network file system-based data storage system in accordance with one embodiment of the invention. Index engine 700, shown in FIG. 7 includes an in-memory merge buffer 705, the in-memory merge buffer 705 includes a set of buckets 707, that correspond to a set of discrete buckets 710 included in generation i of the on-disk index 715. For one embodiment of the invention, the correspondence between the in-memory buckets and the on-disk buckets may be one-to-one. Alternatively, several of the in-memory buckets may map to a single on-disk bucket or vice versa.

When the merge buffer 705 fills up the index engine effects a merge operation to merge the in-memory merge buffer 705 with the on-disk index 715 to create a generation i+1 of the index 720 that contains all of the VLDSs. The merge operation proceeds as follows.

First the merge buffer is written out as a partial index i+1 725 for a set of DCs. Next, the in-memory buckets 707 are merged with the on-disk buckets 710. Finally, a new merged bucket 722 is written to disk as part of generation i+1 of the index 720. New merged bucket 722 can be written in-place or alternatively can be written to a new location, which may be, for example, another file or a next location in a circular buffer. For one embodiment of the invention, a batch of contiguous batches are merged to increase the size of disk accesses. Additionally, or alternatively, for one embodiment of the invention in which the system stores VLDSs in a new merge buffer, the merge operation is effected in the background.

For one embodiment of the invention, index engine 700 includes one or more additional in-memory merge buffers (e.g., in-memory merge buffer 708) to store entries while a background merge operation is proceeding.

Updates to the on-disk index must be made in a manner that allows recovery from crashes during update. To accomplish this, the updated buckets are written to a different storage location than the original bucket. In the preferred embodiment, the update methodology applied is to maintain the index in the form of a circular buffer divided in sector sized pieces 730 of FIG. 7A. An on-disk bucket consists of one or more disk sectors. New index entries are tracked in an in-memory merge buffer 705. The new entries are then merged on a bucket-by-bucket basis by combining the data of merge buffer bucket 707 with the data of the on-disk bucket 710 to create a new merged bucket 722 that is written to disk at the next location in the on-disk circular buffer. Periodically, on-disk pointers 735 to the buckets are updated. When the on-disk pointers to the buckets are updated, the new merged bucket replaces the old bucket. In the event of a crash, the on-disk index will include either the old bucket or the new bucket. For one embodiment of the invention, the pointers 735 point to locations of the bucket in a circular buffer (which may be different for subsequent generations of the index). The pointers 735 also point to unallocated storage space in which to locate the next bucket.

In one embodiment, the merged buckets are written to a new file which stores the new on-disk index instead of a circular buffer. In this case, after the merge completes, the old file containing the pre-merge version of the index is deleted.

During crash recovery, it is also necessary to recover the in-memory merge buffer which may be lost during a crash or power failure. To accomplish this, the merge buffer may be stored in non-volatile RAM so that it survives crashes and power failures. For an alternative embodiment of the invention, the entries that are added to the merge buffer are stored in a log where they can be found during crash recovery and used to reconstruct the in-memory merge buffer. Such an embodiment does not require non-volatile RAM and is therefore less expensive to implement.

For one embodiment of the invention, the DCs are stored as a log. For such an embodiment, recovery is effected by scanning the DC log and recovering the merge buffer from the metadata stored therein.

For one embodiment of the invention, old partial indexes are maintained to facilitate index checking and reconstruction of the full index. If all partial indexes are maintained, together, they will include all of the entries in the single full index.

The frequency of full index update is governed by the maximum size of a partial index. The sizing of the partial indexes is governed by the total time to write a partial index to disk or by the size of the in-memory merge buffer.

Lookups start by examining the in-memory merge buffer. If the fingerprint is not found in memory, the lookup continues on at the on-disk full index.

General Matters

Embodiments of the invention provide a network file system-based data storage system that allows efficient compression of data.

For one embodiment, such a storage system may be used a backup storage system to provide efficient and reliable data storage as well as fast and reliable data recovery.

Some portions of the detailed descriptions above are presented in terms of algorithms and symbolic representations of operations on data stored within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as stored data, values, characters, or the like.

It should be borne in mind, however, that all of these and similar terms are merely convenient labels applied to these quantities. Unless specifically stated otherwise as apparent from the above discussion, it is appreciated that throughout the description, discussions utilizing terms such as "processing" or "computing" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention are described as processes by which data is received and stored. Such embodiments of the invention have been described as having various operations. Such operations are exemplary and may be described in their most basic form, but operations can be added to or deleted from the process without departing from the basic scope of the invention in accordance with various embodiments.

For example, for one embodiment of the invention, the operation of buffering the received data may continue until an entire file is received and ordered. Alternatively, each Write may be processed as received.

Or, for example, the fixed-size data blocks may be received in temporal order obviating the need to buffer the received data.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine readable medium includes machine readable storage media (read only memory ("ROM"); random access memory ("RAM"); magnetic disk storage media; optical storage media; flash memory devices); and machine readable transmission media (electrical, optical, acoustical or other form of propagated signals (e.g., carrier waves, infrared signals, digital signals, etc.)); etc.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A file system comprising:
   an index engine to maintain an index recoverable from crashes, the index engine including:
   an on-disk circular buffer to store a current on-disk set of hash-table buckets to store a current on-disk set of index entries at a current location;
   an in-memory merge buffer to store a current in-memory set of hash-table buckets to store a current in-memory set of index entries between merges, wherein recovery from crashes between and during merges is effected by one of the in-memory merge buffer being stored in a non-volatile memory and the current in-memory set of index entries being duplicated in an on-disk log;
   a merge mechanism, coupled to the on-disk and the in-memory merge buffers, to merge the current on-disk set of hash-table buckets and the current in-memory set of hash-table buckets to create at a new location in the on-disk circular buffer a new version of the current on-disk set of hash-table buckets storing the merged on-disk and in-memory set of index entries as the current on-disk set of index entries each time the number of index entries of the current in-memory set of index entries reaches a specified value, wherein the on-disk circular buffer is used for recovery from crashes occurring during merges; and
   an on-disk partial indexes buffer to store all prior in-memory sets of hash-table buckets by said merge mechanism used for said merges to facilitate index checking and reconstruction of the index;
   a segment store unit to segment data into the one or more variable length data segments;
   a storage unit, coupled to the index engine, to store at least one copy of each unique variable length data segment; and
   the index engine and the segment store unit to identify new variable length data segments that are identical to one of the variable length data segments already stored in said storage unit, create for each of the new variable length data segments identical to one of the already stored variable length data segments a reference to the already stored identical variable length data segment, store each of the references in the storage unit, and delete each of the new variable length data segments determined identical to one of the already stored variable length data segments.

2. The system of claim 1,
wherein the index engine maps from a segment-related data to a segment location-related data for each of the one or more unique variable length data segments.

3. The system of claim 2 wherein the segment-related data is a Segment ID.

4. The system of claim 2 wherein the segment-related data is a segment content-related data.

5. The system of claim 4 wherein each of the segment content-related data is a hash of its variable length data segment.

6. The system of claim 3 wherein each of the Segment IDs includes a fingerprint or hash of its variable length data segment.

7. The system of claim 1 wherein one or more of the already stored variable length data segments is compressed using an entropy compression scheme selected from the group consisting of run-length encoding, Huffman coding, Arithmetic coding, Context coding, LZ77, LZ78, LZW, Deflate, Transformation coding, and combinations thereof.

8. The system of claim 1 wherein the file system implements a network file system protocol.

9. The system of claim 8 wherein the network file system protocol is selected from the group consisting of Network File System, Common Internet File System, NetWare Core Protocol, Global File System, Appleshare, InterMezzo File System-, and Andrew File System.

10. A method comprising:
    maintaining by an index engine an index recoverable from crashes, said maintaining including,
    storing in an on-disk circular buffer at a first location a first set of index entries in a first set of hash-table buckets;
    storing a second set of index entries in a second set of hash-table buckets of an in-memory merge buffer, wherein recovery from crashes between and during merges is effected by one of the in-memory merge buffer being stored in a non-volatile memory and the second set of index entries being duplicated in an on-disk log;
    merging the first set of hash-table buckets and the second set of hash-table buckets to create at a second location in the on-disk circular buffer a subsequent version of the index when the number of index entries of the second set of index entries reaches a specified value, the subsequent version of the index organized as a third set of hash-table buckets storing the first set of index entries and the second set of index entries, wherein the on-disk circular buffer is used for recovery from crashes occurring during a given merge; and
    adding to an on-disk partial indexes buffer the second set of hash-table buckets prior to said step of merging to facilitate index checking and reconstruction of the index; and
    segmenting data into the one or more variable length data segments;
    storing, in a storage unit coupled to the index engine, at least one copy of each unique variable length data segment;
    identifying one or more new variable length data segments that are identical to one of the variable length data segments already stored in said storage unit;
    creating, for each of the new variable length data segments identical to one of the already stored variable length data segments, a reference to the already stored identical variable length data segment;
    storing each of the references to the storage unit; and
    deleting each of the one or more new variable length data segments identical to the already stored variable length data segment.

11. The method of claim 10
wherein the index engine maps from a segment-related data to a segment location-related data for each of the one or more unique variable length data segments.

12. The method of claim 11 wherein the segment-related data is a Segment ID.

13. The method of claim 11 wherein the segment-related data is a segment content-related data.

14. The method of claim 13 wherein each of the segment content-related data is a hash of its variable length data segment.

15. The method of claim 12 wherein each of the Segment IDs includes a fingerprint or hash of its variable length data segment.

16. The method of claim 10 further comprising:
    compressing prior to storage in the storage unit of one or more of the already stored variable length data segments using an entropy compression scheme selected from the group consisting of run-length encoding, Huffman coding, Arithmetic coding, Context coding, LZ77, LZ78, LZW, Deflate, Transformation coding, and combinations thereof.

17. The method of claim 10 further comprising:

receiving the data to be segmented through a network file system protocol.

18. An article of manufacture comprising:

a machine-readable storage medium storing instructions, which when executed by a machine, results in the machine performing operations comprising:

maintaining by an index engine an index recoverable from crashes, said maintaining including:

storing in an on-disk circular buffer at a first location a first set of index entries in a first set of hash-table buckets;

storing a second set of index entries in a second set of hash-table buckets of an in-memory merge buffer, wherein recovery from crashes between and during merges is effected by one of the in-memory merge buffer being stored in a non-volatile memory and the second set of index entries being stored in an on-disk log;

merging the first set of hash-table buckets and the second set of hash-table buckets to create a at a second location in the on-disk circular buffer a subsequent version of the index when the number of index entries of the second set of index entries reaches a specified value, the subsequent version of the index organized as a third set of hash-table buckets storing the first set of index entries and the second set of index entries, wherein the on-disk circular buffer is used for recovery from crashes occurring during a given merge; and adding to an on-disk partial indexes buffer the second set of hash-table buckets prior to said step of merging to facilitate index checking and reconstruction of the index; and segmenting data into the one or more variable length data segments;

storing, in a storage unit coupled with the index engine, at least one copy of each unique variable length data segment;

identifying one or more new variable length data segments that are identical to one of the variable length data segments already stored in said storage unit;

creating, for each of the new variable length data segment identical to one of the already stored variable length data segments, a reference to the already stored identical variable length data segment;

storing each of the references to the storage unit; and deleting each of the one or more new variable length data segments identical to the already stored data segment.

19. The article of manufacture of claim 18 wherein the index engine maps from a segment-related data to a segment location-related data for each of the one or more unique variable length data segments.

20. The article of manufacture of claim 19 wherein the segment-related data is a Segment ID.

21. The article of manufacture of claim 19 wherein the segment-related data is a segment content-related data.

22. The article of manufacture of claim 21 wherein each of the segment content-related data is a hash of its variable length data segment.

23. The article of manufacture of claim 20 wherein each of the Segment IDs includes a fingerprint or hash of its variable length data segment.

24. The article of manufacture of claim 18 wherein the machine performs further operations comprising:

compressing prior to storage in the storage unit of one or more of the already stored variable length data segments using an entropy compression scheme selected from the group consisting of run-length encoding, Huffman coding, Arithmetic coding, Context coding, LZ77, LZ78, LZW, Deflate, Transformation coding, and combinations thereof.

25. The article of manufacture of claim 18 wherein the machine performs further operations comprising:

receiving the data to be segmented through a network file system protocol.

* * * * *